United States Patent [19]

Johnson, Jr.

[11] 4,231,770
[45] Nov. 4, 1980

[54] BAG-TYPE FILTER APPARATUS WITH INTERNAL AIR DIFFUSER

[76] Inventor: Allen S. Johnson, Jr., P.O. Drawer 1037, Salisbury, N.C. 28144

[21] Appl. No.: 76,605

[22] Filed: Sep. 18, 1979

[51] Int. Cl.³ .............................................. B01D 46/04
[52] U.S. Cl. .................................. 55/302; 55/341 R; 55/379
[58] Field of Search .......................... 55/293, 302-303, 55/341 R, 368, 379; 210/333 R, 333.1

[56] References Cited

U.S. PATENT DOCUMENTS

| | | | |
|---|---|---|---|
| 2,828,017 | 3/1958 | Ronningen et al. | 55/303 X |
| 3,594,992 | 7/1971 | Carr et al. | 55/302 |
| 4,097,255 | 6/1978 | Samolis | 55/302 X |

FOREIGN PATENT DOCUMENTS

| | | | |
|---|---|---|---|
| 453176 | 1/1975 | U.S.S.R. | 55/302 |
| 443674 | 4/1975 | U.S.S.R. | 55/302 |

*Primary Examiner*—Kathleen J. Prunner
*Attorney, Agent, or Firm*—Bell, Seltzer, Park & Gibson

[57] ABSTRACT

The cleaning of a tubular filter bag when a periodic reverse purge of air is directed into the outlet end of the filter bag is significantly enhanced in accordance with the present invention by providing interiorly of the filter bag means for diffusing and distributing the reverse purge of air throughout the filter bag. More particularly, a hollow diffuser tube is provided extending longitudinally within the tubular supporting cage of the filter bag with one end of the diffuser tube communicating with the outlet end of the filter bag. The diffuser tube has perforations therein located for diffusing and distributing air throughout the filter bag when a periodic reverse purge of air is directed into the outlet end of the filter bag and into the diffuser tube.

10 Claims, 5 Drawing Figures

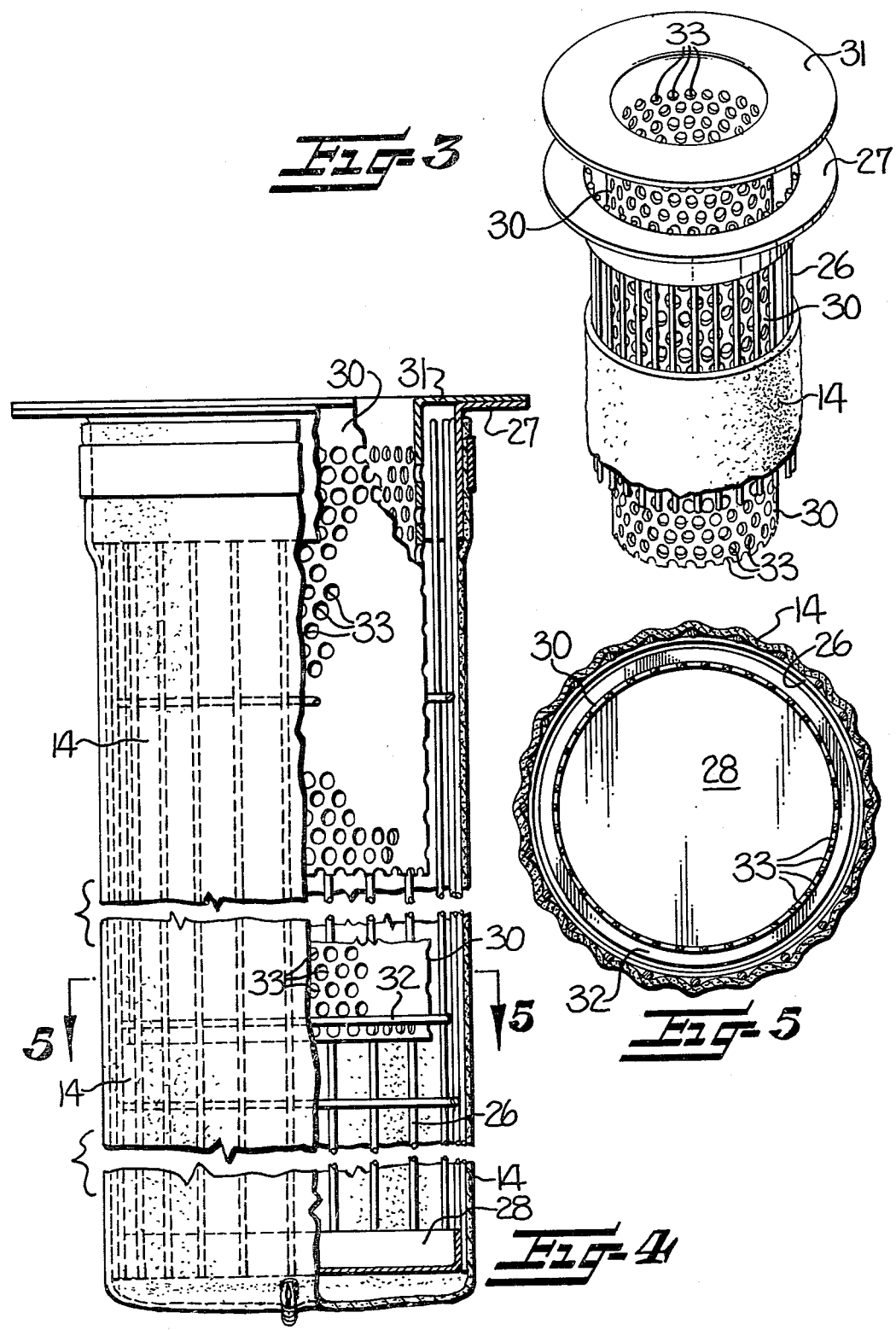

BAG-TYPE FILTER APPARATUS WITH
INTERNAL AIR DIFFUSER

BACKGROUND OF THE INVENTION

This invention relates to a filtering apparatus of the type utilizing elongate baglike tubular filters for filtering particulate material which is entrained in a gas stream. A filtering apparatus of this type generally includes a multiplicity of tubular filter bags mounted in a filter housing or "baghouse" with each filter bag having a supporting frame or "cage" positioned therein so as to hold the filter bag in an open hollow tubular configuration. Particulate-laden gas is directed into the filter housing and flows through the gas permeable filter bags while the particulate material is filtered and retained on the exterior surface of the filter bags. Periodically, a reverse purge of air is directed into the outlet end of the tubular filter bags for dislodging the trapped particulate material from the filter bags and thus cleaning the filter bags.

One of the problems with this type of filtering apparatus is that the cleaning operation is not very effective in removing the particulate material from the filter bags. After the filter bags have been in use for a period of time they become increasingly clogged with particulate material. This undesirably increases the pressure drop across the filtering apparatus and significantly reduces its efficiency. In some filtering applications, the inability to effectively clean the filter bags of the particulate material is so severe that it is necessary to frequently replace the filter bags.

Also, as a result of the particulate material which is trapped in the filter bags and the resulting obstruction to air flow, the filtering apparatus must be designed with a relatively large number of filter bags and with a relatively low ratio of air flow to filter area in order that the filtering apparatus will remain serviceable as the filter bags become increasingly clogged with particulate material.

The presence of particulate material in the filter bags also causes abrasive wear of the bags and results in a shortened useful life. Typically, a filter bag will have a useful life of up to about two years. However, in severe applications, as for example where the particulate material is of a highly abrasive nature, the filter bags may wear out in a matter of weeks. Considering that the usual filtering apparatus may contain many hundreds of filter bags, and that a single bag may cost from fifty to one hundred dollars, the cost of continually replacing the filter bags makes the operational cost of the filtering apparatus quite high. Yet, in many applications the use of filtration apparatus is required by governmental air quality standards in order to limit the amount of particulate material in effluent gases.

Until the present invention, there has been no satisfactory solution to the problems of excessive filter bag wear and ineffective cleaning of the filter bags in a bag-type filtering apparatus. While various attempts have been made to improve the cleaning of the filter bags, as disclosed in U.S. Pat. Nos. 3,053,030 and 3,874,857, for example, the prior attempts have not adequately solved the existing problems.

SUMMARY OF THE INVENTION

In accordance with the present invention it has been discovered that the cleaning of a filter bag is significantly enhanced by providing interiorly of the filter bag means for diffusing and distributing air throughout the filter bag when a periodic reverse purge of air is directed into the outlet end of the filter.

More particularly, in accordance with the present invention, a hollow diffuser tube is provided extending longitudinally within the tubular supporting cage and with one end thereof communicating with the outlet end of the filter bag. The diffuser tube has perforations therein located for diffusing and distributing air throughout the filter bag when a periodic reverse purge of air is directed into the outlet end of the filter bag. The more uniform distribution of the purge air results in more effective cleaning of the filter bag while also reducing excessive flexing of the filter bag and reducing abrasive wear thereof. The hollow diffuser tube of the present invention thereby provides a substantial increase in the efficiency of the filter apparatus and a significant increase in the life of the filter bag.

Since the hollow perforated diffuser tube of the present invention presents an obstruction to the flow of air during the normal filtering operation, it would normally be thought that the diffuser tube would interfere with the filtering operation by undesirably raising the pressure drop across the filter. However, it has been determined in accordance with the present invention that any increased pressure drop or interference with air flow which results from the presence of the diffuser tube inside the filter bag is more than offset by the increased cleaning efficiency which is achieved thereby. Tests have shown that while the pressure drop is increased somewhat initially when new filter bags are installed, once the bags have been placed into service the enhanced cleaning of the bags as a result of the presence of the diffuser tube actually brings about a substantial reduction in the pressure drop as compared to a similar arrangement where the hollow diffuser tube of the present invention is not utilized. It has been observed that the increased cleaning efficiency results in increasing the volumetric flow rate through the filter at a given pressure drop by some two to three times. This means that the number of filter bags needed for a particular set of conditions can be significantly reduced. No longer will it be necessary for filter baghouses to be overdesigned in order to take into account or compensate for the reduction in efficiency and increased pressure drop which occurs as the filter bags become clogged during normal service. Thus, the present invention can provide a very significant savings in the overall initial cost of a filtering apparatus, and an attendant benefit in reduced maintenance and operational costs.

A further feature and advantage of the present invention is that the useful life of the filter bags is greatly increased. The frequent need for replacing filter bags due to abrasive wear, as noted earlier, results in considerable down time and a very substantial operating cost. The enhanced cleaning efficiency which is achieved by the provision of the hollow diffuser tube of the present invention results in the removal of particles which would otherwise have remained in the pores of the filter bag to cause abrasive wear of the fabric forming the filter bag. Further, the presence of the hollow diffuser tube inside the filter bag serves to separate or insulate the inner surface of the filter bag from the high velocity stream of filtered air emerging from the outlet end of the filter bag, which would otherwise flow along the inner surface of the filter bag and cause additional wear in this area. Also, by diffusing and distributing the cleaning pulse of air throughout the filter bag, the diffuser tube prevents the filter bag from receiving excessive flexing from a concentrated blast or pulse of air and thereby also serves to increase the life of the filter bag.

BRIEF DESCRIPTION OF THE DRAWINGS

Some of the features and advantages of the invention having been stated, others will become apparent as the description proceeds when taken in connection with the accompanying drawings in which:

FIG. 3 is a perspective view, with parts broken away, showing the various components of the filter assembly in partially assembled relation;

FIG. 4 is a side view, partially in section, of the assembled components; and

FIG. 5 is a sectional view taken substantially along the line 5—5 of FIG. 4.

DESCRIPTION OF THE ILLUSTRATED EMBODIMENT

Figures 1, 2:
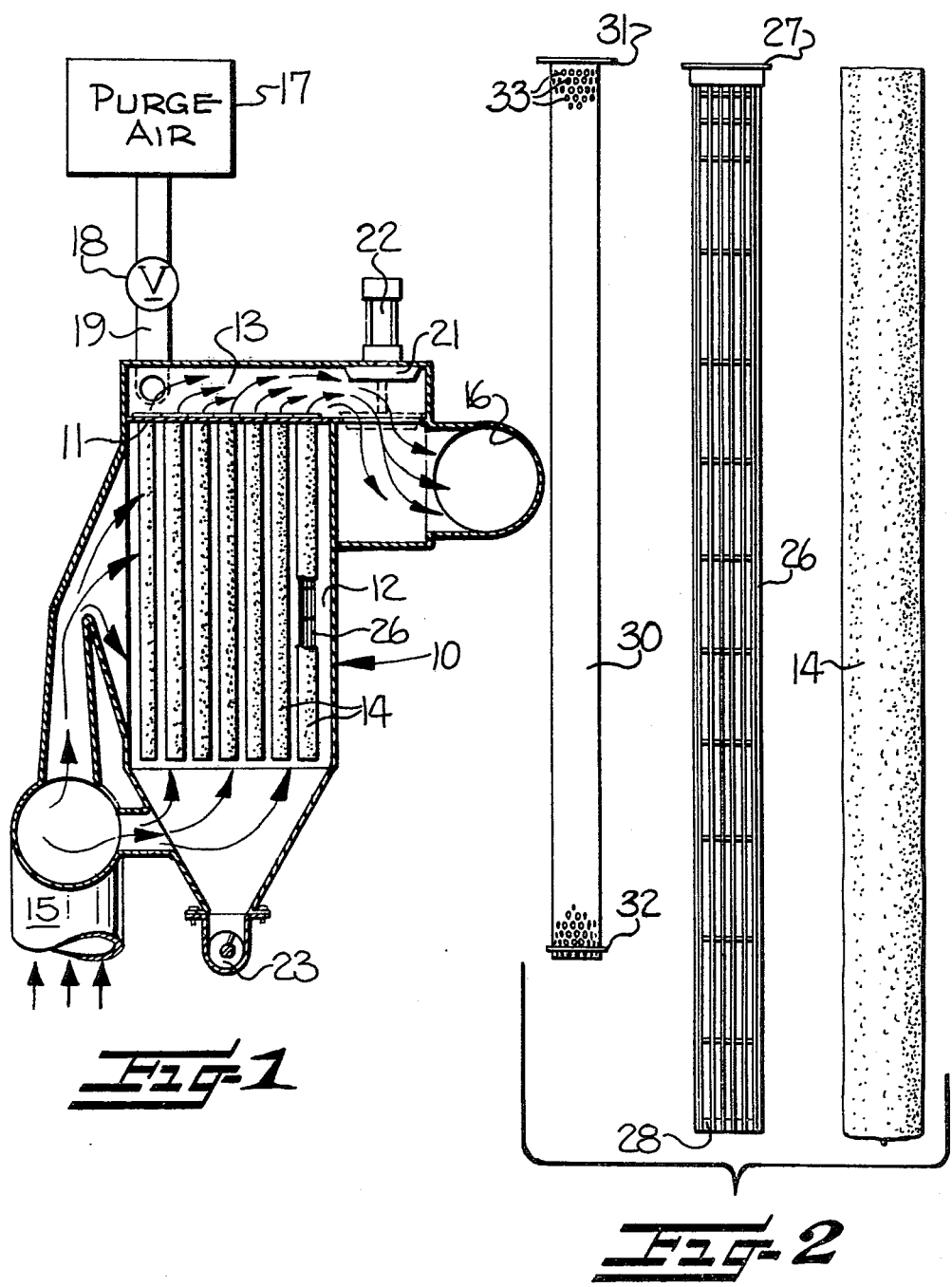
FIG. 1 is a cross-sectional view of a filtering apparatus of the type employing a plurality of bag-type tubular filters.
FIG. 2 is a side view of the various components of a bag-type filter assembly, and showing the filter bag, its supporting cage, and the hollow diffuser tube of the present invention.

Referring now more particularly to the drawings, FIG. 1 illustrates a conventional filtering apparatus of the type utilizing elongate baglike tubular filters. The filtering apparatus includes a filter housing 10, commonly referred to as a "baghouse," which is divided by a horizontal wall 11 into a lower filtering chamber 12 and an upper filtered air plenum 13. A plurality of elongate hollow tubular filter bags, indicated by the reference character 14, are mounted in the filtering chamber 12 in a generally vertical orientation with the upper ends thereof supportingly carried by the horizontal dividing wall 11. The upper ends of the respective filter bags 14 communicate with the filtered air plenum 13 via holes provided in the wall 11.

An inlet duct 15 directs particulate-laden gas into the filtering chamber 12, where it passes around the respective filter bags 14 and then flows through the gas permeable filter bags while the particulate material is filtered and retained on the exterior surface of the filter bags. After passing into the hollow interior of the filter bags 14, the filtered gas passes upwardly through the outlet ends of the respective filter bags and into the filtered air chamber 13. From there, the filtered gas is directed to and through an outlet duct 16.

As the particulate material builds up on the exterior surface of the filter bags 14, it becomes necessary to clean the filter bags and dislodge the accumulated particulate material therefrom. This is accomplished by periodically directing a purging flow of air through the filter bags in a reverse direction. In the illustrated filtering apparatus, purge air from a compressed air source 17 is directed into the filtered air plenum 13 by momentarily opening a valve 18 provided in a compressed air line 19. At the same time, a valve 21 is moved from the position shown in solid lines to that shown in broken lines by suitable actuator 22, such as a pneumatic or hydraulic piston, so as to block the filtered air outlet leading to the outlet duct 16. Consequently, the compressed air is directed in a reverse direction into the outlet ends of the respective filter bags 14. The particulate material which is dislodged from the filter bags is accumulated at the lower end of the filter housing 10 and removed by a screw conveyor 23.

The filter cleaning system utilized in the filtration apparatus illustrated in FIG. 1 is of the type wherein all of the tubular filter bags associated with the filtered air plenum are simultaneously purged with a pulse of compressed air. In another known type of cleaning system for this type of filtering apparatus, compressed air conduits are associated with the outlet ends of each of the respective filter bags so as to selectively direct a pulse jet of compressed air into respective filter bags. Still another known type of cleaning system utilizes a reverse flow of air of longer duration, rather than a pulse of air, for cleaning the filter bags. As will become apparent as the description proceeds, the present invention is applicable to all of these known types of cleaning systems.

FIG. 2 illustrates the various components of a filter assembly. As illustrated, each elongate tubular filter bag 14 is made of a gas permeable fabric and in a form somewhat similar to a sock, having one open end and one closed end. The filter assembly also includes an elongate tubular supporting frame 26, commonly termed a "cage". The supporting frame or cage 26 is of openwork construction for readily allowing the flow of air therethrough, and is typically formed of heavy wire. The supporting frame or cage 26 has an outwardly extending rim or flange 27 at the upper end thereof for securing the cage to the wall 11 of the filter housing, and the lower end of the cage 26 is closed by an end plate 28. The cage 26 is adapted to be positioned inside the tubular filter bag 14 so as to hold the filter bag in an open tubular configuration and prevent it from collapsing upon itself during the filtering operation as the particulate-laden gas passes inwardly therethrough.

In accordance with the present invention there is provided in combination with the conventional filter bag 14 and supporting cage 26 a hollow diffuser tube, indicated by the reference character 30. As illustrated, the diffuser tube 30 is of a size adapted for being slidingly received longitudinally within the hollow supporting cage 26. The diffuser tube 30 is preferably provided with an outturned lip or flange 31 at the upper end thereof to assist in mounting the diffuser tube in place within the tubular supporting cage 26 and is also preferably provided at the lower end thereof with a ringlike spacer 32 or other suitable means to assist in maintaining the diffuser tube 30 centered within the surrounding cage.

Preferably, the diameter of the diffuser tube 30 is as large as possible so as to maximize the cross-sectional area of the diffuser tube while still allowing sufficient clearance between the diffuser tube and the cage 26 to permit sliding the diffuser tube into position within the cage and so that the diffuser tube will be substantially out of contact with the surrounding cage 26 and the filter bag 14. Typically, the outside diameter of the diffuser tube is about one to two inches less than the inside diameter of the surrounding cage.

The diffuser tube 30 may be formed of any suitable material which is capable of withstanding the conditions to which the filtering system is subjected. For example, in a filtering system which is subjected to high temperature effluent gases which may be of a corrosive nature, stainless steel is the preferred material. However, in other less severe applications other materials may be suitable.

As illustrated, the diffuser tube is of a circular cross section for being received within a surrounding supporting cage which is also of a circular cross section. However, the diffuser tube may be constructed of a different cross-sectional shape, such as oval for example, in order to fit within cages of other cross-sectional shapes.

The diffuser tube 30 has perforations or openings 33 formed therein which serve for diffusing and distributing air throughout the filter bag when a periodic reverse purge of air is directed into the outlet end of the filter and into the diffuser tube. In the illustrated embodiment the perforations 33 are located substantially throughout the longitudinal and circumferential extent of the diffuser tube. Preferably, the size and spacing of the perforations 33 is such that the diffuser tube has a void area of from about 35% to about 50%.

It has been discovered in accordance with the present invention that one of the primary reasons for the ineffective cleaning of the conventional filter bag arrangement is that the pulse or blast of reverse purge air was concentrated in the area adjacent where it entered the interior of the filter, namely adjacent the outlet end of the filter. The effect of the reverse purge was substantially dissipated at the far end of the filter from the air outlet. Thus, while the outlet end of the filter was being acted upon by the reverse purge of air, and in fact may have actually been overcleaned, the far end of the filter was essentially left uncleaned. As a result, the entire length of the filter bag was not being effectively utilized for filtration and the efficiency of the filter diminished accordingly.

The hollow perforated diffuser tube 30 of the present invention performs the function of diffusing and distributing the pulse or blast of cleaning air over the entire filter bag to thus provide much more effective and efficient cleaning of the filter bag. Tests have shown that up to 30% by weight more particulate material is removed from the filter bag as a result of the provision of the diffuser tube. Also, as a result of the enhanced cleaning, the volume of air which can flow through the filter at a given pressure drop operation is increased by some two to three times.

The concentration of the cleaning air pulse adjacent the outlet end of the filter under the prior conventional arrangement also resulted in excessive flexing of the filter bag in that area. The more even distribution of the cleaning air as a result of the provision of the diffuser tube avoids this overflexing of the filter bag and thereby contributes to an increased useful life of the bag.

Another factor which has heretofore contributed to the wear of the filter bag is the high velocity flow of air along the inside surfaces of the filter bag adjacent the outlet end of the filter. While the velocity of the air as it passes through the filter bag is relatively low, the air velocity interiorly of the filter bag adjacent the outlet end thereof is considerably higher because of the reduced cross-sectional flow area as compared to the overall surface area of the filter bag. This relatively high velocity air, together with the dust particles which pass through the filter bag and are entrained in the air, would normally flow across the interior surface of the filter bag and cause additional wear and abrasion in this area. The provision of the diffuser tube of the present invention inside the filter bag serves to separate or insulate the interior surface of the filter bag from this high velocity air, thereby further contributing to the increased life of the filter bag.

From FIGS. 2 and 4 it is apparent that in the illustrated embodiment of the invention, the diffuser tube 30 is of a length somewhat less than the overall length of the supporting cage 26 and that the lower end as well as the upper end of the diffuser tube 30 are open, with the tube thus being open-ended. In order to achieve the benefits and advantages of the present invention, it has been determined that it is not necessary for the diffuser tube 30 to extend the full length of the surrounding cage, although it may if so desired. The diffuser tube 30 should preferably have a length of at least about half the overall length of the surrounding cage 26, and most desirably about two-thirds to three-fourths the overall length of the cage. However, it has been determined that lengths considerably less than these preferred lengths still provide very beneficial results as compared to the results obtained in accordance with the prior art arrangement where no diffuser tube is employed.

The substantially enhanced cleaning effectiveness provided by the diffuser tubes of the present invention is illustrated by the test results which follow.

EXAMPLE

Comparative flow tests were conducted using a laboratory filter testing apparatus having two zones, each zone provided with twelve bag-type filters of similar construction. The filters of one zone (Zone 1) were of the conventional construction and included only the filter bags and their supporting cages, while the filters of the second zone (Zone 2) were equipped with perforated diffuser tubes in accordance with the invention. Tests were run at varying air flow rates providing an air-to-cloth (A/C) ratio of 6, 8 and 12 (cubic feet per minute per square foot of filter area) and with a fixed dust feed of six ounces per minute, which at 6 A/C ratio would be 1.5 grains per cubic foot dust load. The data of Table I show the air volumes handled by each zone, at an A/C ratio of 6 with new filter bags, and the associated percentage of air flow handled by each zone.

TABLE I

| Comparative Air Flow Rates Through New Filter Bags | | | | |
|---|---|---|---|---|
| | ZONE 1 (prior art) | | ZONE 2 (the invention) | |
| | AIR FLOW | | AIR FLOW | |
| TIME | (CFM) | (%) | (CFM) | (%) |
| 0 | 1125 | 64.1 | 629 | 35.9 |
| 1 | 1042 | 59.5 | 708 | 40.5 |
| 2 | 1010 | 58.6 | 715 | 41.4 |
| 3 | 961 | 56.5 | 739 | 43.5 |
| 4 | 926 | 54.5 | 774 | 45.5 |
| 6 | 890 | 53.1 | 785 | 46.8 |
| 7 | 862 | 51.5 | 813 | 48.5 |
| 8 | 862 | 51.5 | 813 | 48.5 |

These data show that upon initial start-up with new bags, the conventional filters (Zone 1) handled 64.1% of the air flow, while the filters equipped with the diffuser tube of the invention (Zone 2) handled only 35.9% of the air flow. This is attributable to the air flow obstruction created by the presence of the diffuser tube within the filter. After a period of operation of eight minutes, the air flow handled by the respective zones was almost equal, with Zone 1 handling 51.5% of the air flow and Zone 2 handling 48.5%.

The filters were then cleaned by a reverse purging flow of air through the filters. The data of Table II show the air flow handled by each zone after cleaning.

TABLE II

Comparative Air Flow Rates Through Filter Bags After One Cleaning Cycle

| | ZONE 1 (prior art) | | ZONE 2 (the invention) | |
|---|---|---|---|---|
| | AIR FLOW | | AIR FLOW | |
| TIME | (CFM) | (%) | (CFM) | (%) |
| 0 | 457 | 26.1 | 1293 | 73.9 |
| 1 | 472 | 27.0 | 1278 | 73.0 |
| 2 | 543 | 31.5 | 1182 | 68.5 |
| 3 | 553 | 32.1 | 1172 | 67.9 |
| 4 | 553 | 32.1 | 1172 | 67.9 |
| 5 | 598 | 35.2 | 1102 | 64.8 |
| 6 | 598 | 35.2 | 1102 | 64.8 |
| 7 | 646 | 38. | 1054 | 62.0 |
| 8 | 646 | 38. | 1054 | 62.0 |

Upon cleaning, the filters of Zone 1 handled only 26.1% of the air flow while the filters of Zone 2 handled 73.9% of the air flow. This shows that the filters equipped with the diffuser tubes of the invention were much more effectively cleaned than the conventional filters of Zone 1. Even after eight minutes of operation, the filters of Zone 2 remained considerably cleaner than those of Zone 1, handling 62% of the air flow as compared to 38% of the air flow in Zone 1.

Similar results were observed at A/C ratios of 8 and 12.

In the drawings and specification there has been set forth a preferred embodiment of the invention, and although specific terms are employed, they are used in a generic and descriptive sense only and not for purposes of limitation.

What is claimed is:

1. In a filter apparatus of the type wherein a particulate-laden gas is directed through a tubular filter bag for filtering and retaining the particulate material on the exterior of the bag, and wherein the filter bag is cleaned by a periodic reverse purge of air into the bag, said filter bag having an outlet end for discharge of the filtered gas and being supported by a tubular supporting cage positioned within said filter bag, the combination therewith of hollow, open-ended means with openings therein, said hollow means extending longitudinally within said tubular supporting cage and communicating with said outlet end of the filter bag for receiving a reverse purge of air therein for diffusing and distributing the air throughout the filter bag when a periodic reverse purge of air is directed into the outlet end of the filter bag so as to more effectively clean the filter bag while also reducing excessive flexing of the filter bag and abrasive wear thereof to thereby provide a substantial increase in the efficiency of the filter apparatus and a significant increase in the life of the filter bag.

2. In a filter apparatus of the type having a filtering chamber containing a plurality of tubular filter bags, wherein a particulate-laden gas is directed into the filtering chamber and through the respective tubular filter bags for filtering and retaining the particulate material on the exterior of the bags, and wherein the filter bags are cleaned by a periodic reverse purge of air into the bags, and wherein each of said tubular filter bags has an outlet end for discharge of the filtered gas and is supported by a tubular supporting cage positioned within said filter bag, the combination therewith of a hollow diffuser tube extending longitudinally within each of said tubular supporting cages, each of said diffuser tubes having one end thereof communicating with said outlet end of the filter bag and having perforations therein located for diffusing and distributing air throughout the filter bag when a periodic reverse purge of air is directed into the outlet end of the filter bag and into the diffuser tube so as to more effectively clean the filter bag while also reducing excessive flexing of the filter bag and abrasive wear thereof to thereby provide a substantial increase in the efficiency of the filter apparatus and a significant increase in the life of the filter bag.

3. In a filter apparatus of the type having a filtering chamber containing a plurality of tubular filter bags, wherein a particulate-laden gas is directed into the filtering chamber and through the respective tubular filter bags for filtering and retaining the particulate material on the exterior of the bags, and wherein the filter bags are cleaned by a periodic reverse purge of air into the bags, and wherein each of said tubular filter bags has an outlet end for discharge of the filtered gas and is supported by a tubular supporting cage positioned within said filter bag, the combination therewith of a hollow diffuser tube extending longitudinally within each of said tubular supporting cages, each of said diffuser tubes having one end thereof communicating with said outlet end of the filter bag and being mounted in inwardly spaced relation from said supporting cage substantially throughout its length so as to be positioned substantially out of contact with said tubular filter bag, and said hollow diffuser tube having perforations therein located for diffusing and distributing air throughout the filter bag when a periodic reverse purge of air is directed into the outlet end of the filter bag and into the diffuser tube so as to more effectively clean the filter bag while also reducing excessive flexing of the filter bag and abrasive wear thereof to thereby provide a substantial increase in the efficiency of the filter apparatus and a significant increase in the life of the filter bag.

4. In a filter apparatus of the type wherein a particulate-laden gas is directed through a tubular filter bag for filtering and retaining the particulate material on the exterior of the bag, and wherein the filter bag is cleaned by a periodic reverse purge of air into the bag, said filter bag having an outlet end for discharge of the filtered gas and being supported by a tubular supporting cage positioned within said filter bag, the combination therewith of hollow perforated means having a length less than said tubular supporting cage positioned within said tubular supporting cage and cooperating with said outlet end of the filter bag for diffusing and distributing throughout the filter bag air received within said hollow perforated means when a periodic reverse purge of air is directed into the outlet end of the filter bag so as to more effectively clean the filter bag while also reducing excessive flexing of the filter bag and abrasive wear thereof to thereby provide a substantial increase in the efficiency of the filter apparatus and a significant increase in the life of the filter bag.

5. A filter apparatus according to claim 4 wherein said hollow perforated means positioned within said tubular supporting cage has an overall length of at least about half the overall length of the surrounding tubular supporting cage.

6. A filter apparatus according to claim 4 wherein said hollow perforated means positioned within said tubular supporting cage has open upper and lower ends.

7. A filter apparatus according to any one of claims 4, 5 or 6 wherein said hollow perforated means is positioned substantially out of contact with said surrounding tubular supporting cage and said filter bag.

8. In a filter apparatus of the type wherein a particulate-laden gas is directed through a tubular filter bag for filtering and retaining the particulate material on the exterior of the bag, and wherein the filter bag is cleaned by periodic reverse purge of air into the bag, said filter bag having an outlet end for discharge of the filtered gas and being supported by a tubular supporting cage positioned within said filter bag, the combination therewith of a hollow perforated tube positioned within said tubular supporting cage substantially out of contact with said surrounding cage and said filter bag, said hollow perforated tube having a length less than said tubular supporting cage and cooperating with said outlet end of the filter bag for diffusing and distributing throughout the filter bag air received within said perforated tube when a periodic reverse purge of air is directed into the outlet end of the filter bag so as to more effectively clean the filter bag while also reducing excessive flexing of the filter bag and abrasive wear thereof to thereby provide a substantial increase in the efficiency of the filter apparatus and a significant increase in the life of the filter bag.

9. A filter apparatus according to claim 8 wherein said hollow perforated tube has an overall length of at least about half the overall length of the surrounding tubular supporting cage.

10. A filter apparatus according to claim 8 or 9 wherein said hollow perforated tube has open upper and lower ends.